US008264616B2

(12) United States Patent
Sugano et al.

(10) Patent No.: US 8,264,616 B2
(45) Date of Patent: Sep. 11, 2012

(54) SCENE CLASSIFICATION APPARATUS OF VIDEO

(75) Inventors: Masaru Sugano, Saitama (JP); Yasuyuki Nakajima, Saitama (JP); Hiromasa Yanagihara, Saitama (JP)

(73) Assignee: KDDI R&D Laboratories, Inc., Saitama (JP)

( * ) Notice: Subject to any disclaimer, the term of this patent is extended or adjusted under 35 U.S.C. 154(b) by 1182 days.

(21) Appl. No.: 10/670,245

(22) Filed: Sep. 26, 2003

(65) Prior Publication Data

US 2004/0223052 A1 Nov. 11, 2004

(30) Foreign Application Priority Data

Sep. 30, 2002 (JP) ................................ 2002-285667

(51) Int. Cl.
*H04N 5/14* (2006.01)

(52) U.S. Cl. ........ 348/700; 382/168; 348/699; 348/171; 348/578

(58) Field of Classification Search .................. 348/700, 348/578, 586, 171, 699; 382/168
See application file for complete search history.

(56) References Cited

U.S. PATENT DOCUMENTS 5,264,933 A * 11/1993 Rosser et al. ................ 348/578
5,767,922 A * 6/1998 Zabih et al. .................. 348/700
5,801,765 A * 9/1998 Gotoh et al. ................. 348/155
5,809,202 A 9/1998 Gotoh et al.
5,835,163 A * 11/1998 Liou et al. ..................... 348/700
5,959,690 A * 9/1999 Toebes et al. ................ 348/578
5,990,980 A * 11/1999 Golin ........................... 348/700
6,072,542 A 6/2000 Wilcox et al.
6,078,726 A 6/2000 Gotoh et al.
6,347,114 B1 * 2/2002 Blanchard ..................... 375/240
6,389,168 B2 * 5/2002 Altunbasak et al. .......... 382/224
6,392,710 B1 * 5/2002 Gonsalves et al. ............ 348/578
6,449,019 B1 * 9/2002 Fincher et al. ................ 348/578
6,473,459 B1 * 10/2002 Sugano et al. ........... 375/240.16
6,549,643 B1 * 4/2003 Toklu et al. ................... 382/107
6,597,738 B1 * 7/2003 Park et al. ................ 375/240.16

(Continued)

FOREIGN PATENT DOCUMENTS

JP 06-149902 5/1994

(Continued)

OTHER PUBLICATIONS

Yimaz, Alper; Shot Detection Using Principal Coordinate System (2000), 2000 p. 1-6.*

(Continued)

*Primary Examiner* — Jayanti K Patel
*Assistant Examiner* — Jessica Prince
(74) *Attorney, Agent, or Firm* — Westerman, Hattori, Daniels & Adrian, LLP

(57) ABSTRACT

The present invention provides a scene classification apparatus for classifying uncompressed or compressed video into various types of scenes at low cost and with high accuracy using characteristics of a video and audio characteristics accompanied by the video. When video are compressed data, their motion intensity, spatial distribution of motion and histogram of motion direction are detected by using values of motion vectors of predictive coding images existing in respective shots, and the respective shots of the video are classified into a dynamic scene, a static scene, a slow scene, a highlight scene, a zooming scene, a panning scene, a commercial scene and the like based on the motion intensity, the spatial distribution of motion, the histogram of motion direction and shot density.

16 Claims, 7 Drawing Sheets

VIDEO + AUDIO DATA
10 SHOT SEGMENTATION PART
101 NS DETECTOR
102 DS DETECTOR
11 AUDIO DATA ANALYZER
12 MOTION DATA ANALYZER
121 IS DETECTOR
122 MSD DETECTOR
123 HD DETECTOR
1 DYNAMIC/STATIC SCENE DETECTOR
2 SLOW SCENE DETECTOR
3 FIRST HIGHLIGHT SCENE DETECTOR
4 SECOND HIGHLIGHT SCENE DETECTOR
5 HIGHLIGHT SCENE DETECTOR
6 VIDEO TRANSITION EFFECT INSERTING SECTION
7 ZOOMING SCENE DETECTOR
8 PANNING SCENE DETECTOR
9 COMMERCIAL SCENE DETECTOR

U.S. PATENT DOCUMENTS

| | | | | |
|---|---|---|---|---|
| 6,606,409 | B2 * | 8/2003 | Warnick et al. | 382/173 |
| 6,895,361 | B2 * | 5/2005 | Yang | 702/179 |
| 6,909,745 | B1 * | 6/2005 | Puri et al. | 375/240.01 |
| 7,006,945 | B2 | 2/2006 | Li | |
| 7,035,435 | B2 * | 4/2006 | Li et al. | 382/107 |
| 7,042,512 | B2 * | 5/2006 | Yang et al. | 348/452 |
| 7,058,130 | B2 * | 6/2006 | Liu et al. | 375/240.16 |
| 7,110,454 | B1 * | 9/2006 | Chakraborty | 375/240.16 |
| 2001/0051516 | A1 * | 12/2001 | Nakamura et al. | 455/412 |
| 2002/0018594 | A1 * | 2/2002 | Xu et al. | 382/190 |
| 2002/0078438 | A1 * | 6/2002 | Ashley | 725/1 |
| 2002/0080162 | A1 * | 6/2002 | Pan et al. | 345/723 |
| 2002/0126758 | A1 * | 9/2002 | Blanchard | 375/240.13 |
| 2003/0007555 | A1 * | 1/2003 | Divakaran et al. | 375/240.01 |
| 2003/0067560 | A1 * | 4/2003 | Suzuki | 348/578 |
| 2004/0027369 | A1 * | 2/2004 | Kellock et al. | 345/716 |
| 2004/0062520 | A1 * | 4/2004 | Gutta et al. | 386/46 |
| 2004/0167767 | A1 | 8/2004 | Xiong et al. | |
| 2005/0267740 | A1 * | 12/2005 | Abe et al. | 704/206 |
| 2006/0280365 | A1 * | 12/2006 | Gong et al. | 382/173 |

FOREIGN PATENT DOCUMENTS

| | | | |
|---|---|---|---|
| JP | 08-339379 | | 12/1996 |
| JP | 10-224741 | A | 8/1998 |
| JP | 11-55613 | A | 2/1999 |
| JP | 11-252509 | | 9/1999 |
| JP | 2001-69437 | A | 3/2001 |
| JP | 2001-251581 | A | 9/2001 |
| JP | 2001-258038 | A | 9/2001 |
| JP | 2002-199332 | A | 7/2002 |
| JP | 2004-128550 | A | 4/2004 |

OTHER PUBLICATIONS

M. van der Schaar et al., "*A Hybrid Temporal-SNR Fine-Granular Scalability for Internet Video*", IEEE Transactions on Circuits and Systems for Video Technology, vol. 11. , No. 3., Mar. 2001, pp. 318-331.

F. Wu et al., "*A Framework for Efficient Progressive Fine Granularity Scalable Video Coding*", IEEE Transactions on Circuits and Systems for Video Technology, vol. 11., No. 3., Mar. 2001, pp. 332-344.

Japanese Office Action dated Aug. 1, 2007, Application No. 2002-285667.

Alan Hanjalic, "Generic Approach to Highlights Extraction from a Sport Video", ICIP2003, Sep. 14-17, 2003, Barcelona, Spain, vol. I, pp. 1-4.

Ahmet Ekin et al., "Robust Dominant Color Region Detection and Color-Based Applications for Sport Video", ICIP2003, Sep. 14-17, 2003, Barcelona, Spain, vol. I, pp. 21-24.

J. Assfalg et al., "Automatic Extraction and Annotation of Soccer Video Highlights", ICIP2003, Sep. 14-17, 2003, Barcelona, Spain, vol. II, pp. 527-530.

Peng Xu et al., "Algorithms and System for Segmentation and Structure Analysis in Soccer Video", ICME2001, Aug. 22-25, 2001, EP10.04, pp. 928-931.

Riccardo Leonardi et al., "Semantic Indexing of Soccer Audio Visual Sequences", IEEE Translation on Circuits and Systems for Video Technology, vol. 14, No. 5, May 2004, pp. 634-643.

* cited by examiner

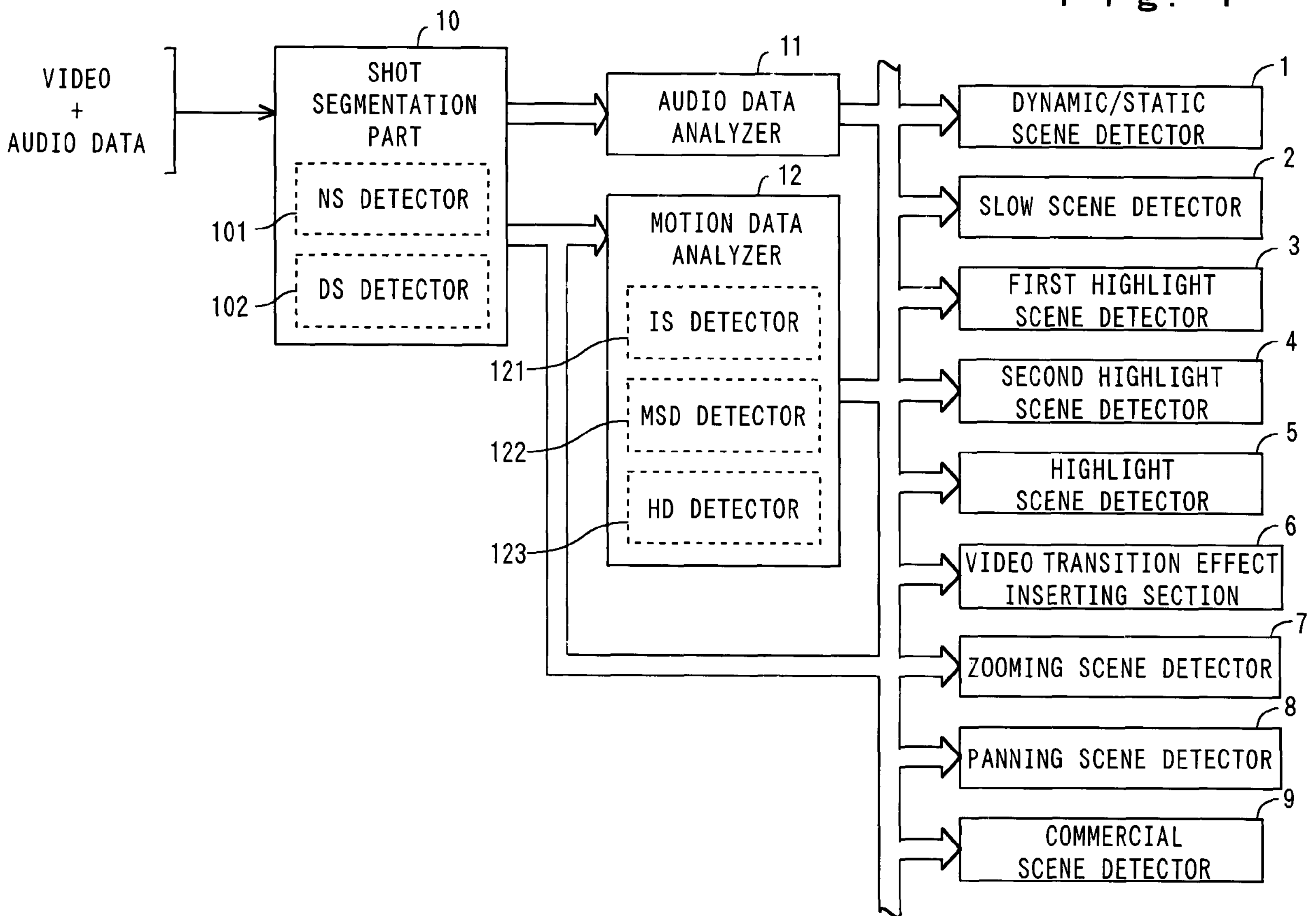
Fig. 1
VIDEO + AUDIO DATA
SHOT SEGMENTATION PART
10
NS DETECTOR
DS DETECTOR
101
102
AUDIO DATA ANALYZER
11
MOTION DATA ANALYZER
12
IS DETECTOR
MSD DETECTOR
HD DETECTOR
121
122
123
DYNAMIC/STATIC SCENE DETECTOR
1
SLOW SCENE DETECTOR
2
FIRST HIGHLIGHT SCENE DETECTOR
3
SECOND HIGHLIGHT SCENE DETECTOR
4
HIGHLIGHT SCENE DETECTOR
5
VIDEO TRANSITION EFFECT INSERTING SECTION
6
ZOOMING SCENE DETECTOR
7
PANNING SCENE DETECTOR
8
COMMERCIAL SCENE DETECTOR
9

SCENE CLASSIFICATION APPARATUS OF VIDEO

BACKGROUND OF THE INVENTION

1. Field of the Invention

The present invention relates to a scene classification apparatus for analyzing uncompressed or compressed video and classifying them into various types of scenes, and particularly relates to a scene classification apparatus for enabling efficient searching and classifying of, and access to the video.

2. Description of the Related Art

As a prior technique relating to the scene classification of video, for example, a system for inputting video of television broadcasting and classifying them by comparatively large units such as news, sports and commercial is suggested. After not only characteristics of the video but also characteristics of audio data accompanied by the video are taken into consideration, a scene classification method is suggested. As to detection of a highlight scene as summary information, a technique for extracting a highlight scene of a sports video in a compressed domain of the compressed video using the audio characteristics accompanied by the data is suggested.

In most of the prior techniques, mainly the video and the audio data accompanied by them are analyzed in an uncompressed data domain, and thus compressed video should be once subject to a decoding process. There, therefore, arises a problem that high processing costs and much processing time are necessary. Since a unit of the scene classification is mainly comparatively large, a scene classification technique according to a more detailed unit is not established. The classification by a detailed unit is important and effective, for example, in viewing a specified scene in video and classifying in a video database.

In a highlight scene extracting method using the conventional audio characteristics, since a peak level of audio data is evaluated, if a plurality of peaks exist in a certain short time interval, an overlapped interval may be extracted as the highlight scene. Since a commercial in television broadcasting occasionally has a comparatively high audio level, the commercial may be misdecided as the highlight scene.

SUMMARY OF THE INVENTION

It is an object of the present invention to provide a scene classification apparatus for classifying uncompressed or compressed video into various types of scenes at low cost and with high accuracy using characteristics of a video and audio characteristics accompanied by the video.

In order to achieve the above object, the present invention is such that following measures are taken in a scene classification apparatus for segmenting video into shots and classifying each scene composed of one or more continuous shots based on a content of the scene.

(1) The apparatus is provided with: a detector for detecting shot density DS of the video; a detector for detecting motion intensity of the respective shots and a dynamic/static scene detector for classifying the respective shots into a dynamic scene with much motions or a static scene with little motions based on the shot density and the motion intensity. Since the shot density accurately represents a quantity of motion of each scene, when the shot density is supposed to be a parameter, the scene can be accurately classified into the dynamic scene or the static scene.

(2) The apparatus is provided with an extractor for extracting a shot similar to a current target shot from shots after a shot before the target shot only by a predetermined interval; and a slow scene detector for classifying the target shot into a slow scene of the similar shot based on motion intensity of the target shot and the similar shot. Since the slow scene is similar to its reference scene and its motion intensity is lower than that of the reference scene, the slow scene can be reliably classified according to the above mentioned characteristics.

(3) A plurality of shots which continue near the slow scene or a scene with large audio signal are classified into a highlight scene. Since the highlight scene includes the slow scene or the scene with large audio signal, according to the above characteristic, the highlight scene can be classified out reliably.

(4) The apparatus is provided with detector for detecting a histogram relating to motion directions of the respective shots; and a detector for detecting a scene on which a camera operation has been performed based on the histogram of motion direction. The histogram of motion direction shows characteristic distribution according to the camera operation, and in the case of a zooming scene, the histogram of motion direction becomes uniform, so that a number of elements of respective bins becomes larger than a reference number of elements. In the case of a panning scene, the histogram of the motion direction is concentrated in one direction (namely, only a number of elements of a certain bin becomes large), and the spatial distribution of motion becomes uniform. According to the above characteristic, therefore, the scene on which the camera operation has been performed can be classified reliably.

(5) The apparatus is provided with a detector for detecting shot density DS of the video; and a commercial scene detector for detecting a commercial scene based on the shot density. Since the shot density increases in the commercial scene, according to the above characteristics, the commercial scene can be classified reliably.

(6) The apparatus is provided with a detector for detecting a number of shot boundaries of the video; and a commercial scene detector for detecting a commercial scene based on the number of shot boundaries. Since the number of shot boundaries increases in the commercial scene, according to the above characteristics, the commercial scene can be classified reliably.

(7) When the video are compressed data, their motion intensity, spatial distribution of motion and histogram of motion direction are detected by using a value of a motion vector of a predictive coding image existing in each shot. According to such a characteristic, types of the respective scenes of the compressed video can be detected on compressed domain without decoding.

BRIEF DESCRIPTION OF THE DRAWINGS

FIG. 1 is a block diagram showing one embodiment of a scene classification apparatus.

DETAILED DESCRIPTION OF THE PREFERRED EMBODIMENT

Figure 2:
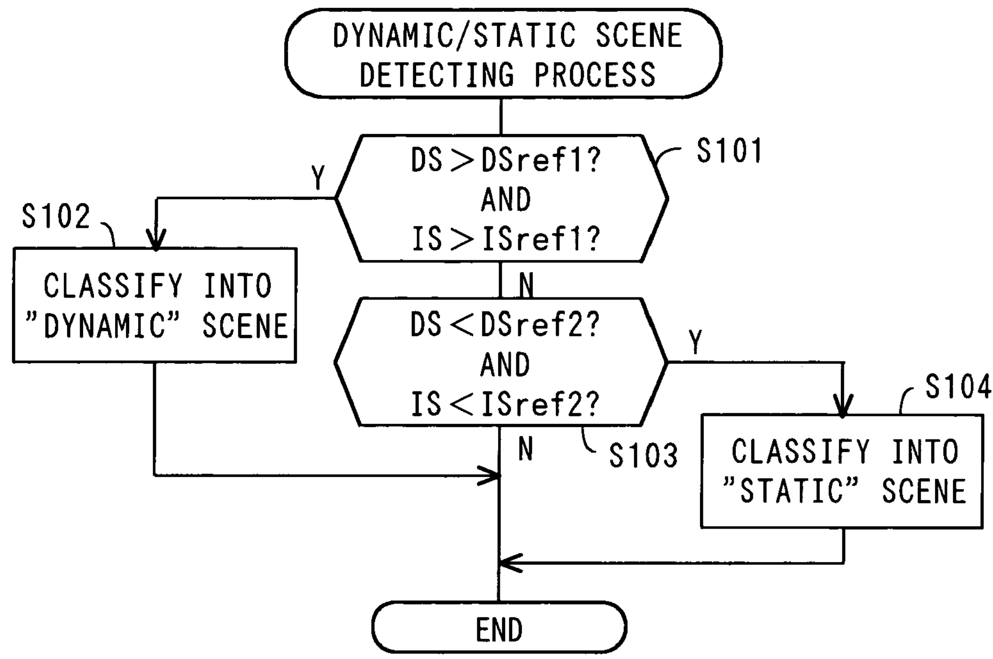
FIG. 2 is a flowchart showing the scene classification procedure in the dynamic/static scene detector 1

FIG. 1 is a block diagram showing one embodiment of a scene classification apparatus to which the present invention is applied, and in this diagram, compressed or uncompressed video are classified into various scenes by shot unit.

A shot segmentation part 10 detects a cut from the video, and segments the video into shots based on the cut information. At the same time, audio information accompanied by the video or audio information multiplexed with the video is demultiplexed so that audio data are generated, and the audio data are distributed to an audio data analyzer 11.

The shot segmentation part 10 includes an NS detector 101 for detecting a total number of shots (NS) of the input video and a DS detector 102 for detecting shot density DS of the video per a time unit.

A motion data analyzer 12 includes an IS detector 121 for detecting motion intensity (IS) of the video per unit region on the image, an MSD detector 122 for detecting spatial distribution of motion (MSD) of the video per unit region on the image, and an HD detector 123 for detecting a motion direction of the video per unit region on the image and generating a histogram of the obtained motion direction.

If the video are compressed data, the motion intensity IS, the spatial distribution of motion MSD and the histogram of motion direction HD can be detected by using a value of a motion vector of a predictive coding image existing in each shot. As to the motion intensity IS, "Motion Intensity" which is an element of "motion activity descriptor" defined in MPEG-7 or the like can be used.

On the other hand, if the video are uncompressed data, frames of the respective shots are compared by a block matching method or the like so that a change in the motion is predicted, and the change of the motion is expressed by a vector. Similarly to the above-mentioned manner, values of the motion intensity IS and the like are calculated by using the motion vector. At this time, as to the motion intensity IS as the shot, a value which is obtained by averaging a value of the motion intensity IS in the predictive coding image as an subject in a shot, a maximum value and an intermediate value of the values of the motion intensity IS can be used. As to the predictive coding image to be a subject and the motion vector, any combination of a forward direction predictive coding image, a bidirectional predictive coding image, a forward directional motion vector and a backward directional motion vector in the bidirectional predictive coding image can be used.

As to the histogram of motion direction HD, directions of respective motion vectors are calculated in the motion information obtained as mentioned above, so that a histogram relating to all the motion vectors in the shot is structured. If a number of bins in the histogram is limited, it is desirable that the motion direction is quantized suitably.

This embodiment adopts quantization with a pitch of 45° to 8 directions which is treated in "Dominant Direction" as an element of the "motion activity descriptor" defined in MPEG-7, for example. Thresholding may be executed according to the size of the motion vector in such a manner that a motion vector which is not more than a certain level is not added as the element of the histogram.

The audio data analyzer 11 analyzes the audio data, and calculates an energy value E per audio signal or band. When the energy value E is calculated per band, an arbitrary band width can be selected, and weighting can be carried out per band.

A dynamic/static scene detector 1 classifies respective shots into a "dynamic" scene with much motions, a "static" scene with little motions and the other scene based on the shot density DS and the motion intensity IS.

A slow scene detector 2 extracts a shot similar to a current target shot from shots after a shot which is before the target shot by a predetermined interval. The slow scene detector 2 classifies the current shot into a slow scene of the similar shot based on the motion intensity of the current shot and the similar shot.

A first highlight scene detector 3 temporarily classifies a scene which is composed of a plurality of shots continuing just before the slow scene into the highlight scene. A second highlight scene detector 4 temporarily classifies a predetermined shot which continues before and after a highlight position detected based on the analyzed result of the audio data analyzer 11 into the highlight scene. A highlight scene detector finally classifies the highlight scene based on temporary classified results of the respective highlight scenes. When a plurality of highlight scenes are connected, a video transition effect inserting section 6 inserts a video transition effect according to scene types between (before and after) the highlight scenes.

A zooming scene detector 7 classifies the respective shots into a scene on which zooming as one of camera operations has been performed or the other scenes based on the histogram of motion direction HD. A panning scene detector 8 classifies the respective shots into a scene on which panning as one of the other camera operations has been performed or the other scenes based on the histogram of motion direction HD and the spatial distribution of motion MSD. A commercial scene detector 9 classifies the respective shots into a commercial scene or the other scenes based on the shot density DS.

The scene classification process in this embodiment will be detailed below according to a flowchart.

FIG. 2 is a flowchart showing the scene classification procedure in the dynamic/static scene detector 1, and this is executed on each shot segmented by the shot segmentation part 10. The shots are detected as the "dynamic" scene with much motions or the "static" scene with little motions.

At step S101, the shot density DS detected by the DS detector 102 of the shot segmentation part 10 is compared with first reference density DSref1, and the motion intensity IS detected by the IS detector 121 of the motion data analyzer 12 is compared with first reference intensity ISref1. When relationships: [DS >DSref1 and IS>ISref1] are satisfied, the sequence proceeds to step S102, so that the current target shot is classified into the “dynamic” scene. When [DS>DSref1 and IS>ISref1] are not satisfied at step S101, the sequence proceeds to step S103.

At step S103, the shot density DS is compared with second reference density DSref2 (<DSref1), and the motion intensity is compared with second reference intensity ISref2 (<Isref1). When [DS<DSref2 and IS<ISref2] are satisfied, the sequence proceeds to step S104, so that the current shot is classified into the “static” scene. When [DS<DSref2 and IS<ISref2] are not satisfied at step S104, the current shot is not classified into the “dynamic” scene nor the “static” scene, so that this process is ended.

Figure 3:
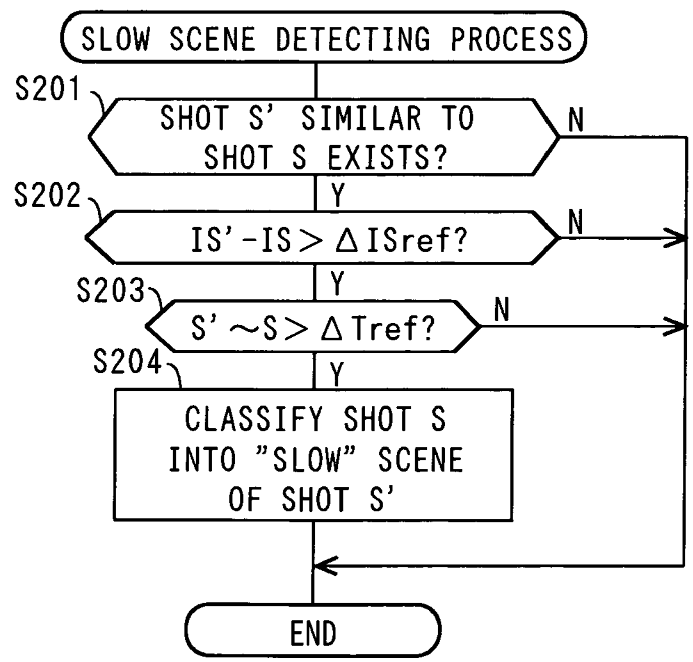
FIG. 3 is a flowchart showing the scene classification procedure in the slow scene detector 2.

FIG. 3 is a flowchart showing the scene classification procedure in the slow scene detector 2, and decision is made whether the shots segmented by the shot segmentation part 10 are shots which compose a slow scene of another temporally previous shot.

At step S201, decision is made whether a shot S' which is similar to a current target shot S exists on an interval predated by predetermined time. When the shot S' similar to shots after the shot before the target shot S by the predetermined interval, the sequence proceeds to step S202.

In this embodiment, the slow scene detector 2 stores, for example, an image which is detected as a shot boundary by the shot segmentation part 10, namely, image data: of a beginning image of the shot as a feature value of all the shots within a certain time, and stores image data of a reduced image of that image and a color layout descriptor which is obtained from the image and defined by MPEG-7, and makes detection whether the shot similar to the target shot input at current time exists in the past. The target shot is compared with not only the beginning image of the shot but also a middle of image of the shot and an image representing the shot (key frame).

At step S202, a differential value between the motion intensity IS of the target shot S and motion intensity IS' of the similar shot S' is compared with a reference differential value Δ ISref. When (IS'-IS)>ΔISref is satisfied, the sequence proceeds to step S203, so that an interval (S' to S) between the target shot S and the similar shot S' is compared with a reference interval Δ Tref. When the shot S' is separated from the shot S by not less than the reference interval Δ Tref, the sequence proceeds to step S204 so that the target shot S is classified into the “slow” scene of the similar shot S'.

Figure 4:
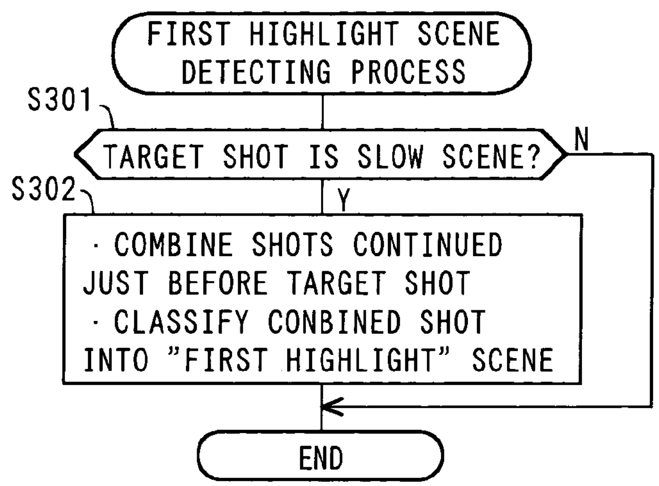
FIG. 4 is a flowchart showing the scene classification procedure in the first highlight scene detector 3.

FIG. 4 is a flowchart showing the scene classification procedure in the first highlight scene detector 3, and the shot classified into the slow scene is used as a reference, so that a plurality of shots which continue just before the shot are provisionally classified into the highlight scene.

At step S301, decision is made whether a current target shot SO is classified into the “slow” scene. When the current target shot S0 is classified into the “slow” scene, the sequence proceeds to step S302, so that a predetermined number of shots S0−m to S0 (or for predetermined time), which continue just before the current shot S0, are combined so that the combined shots are classified into a “first highlight scene”.

Figure 5:
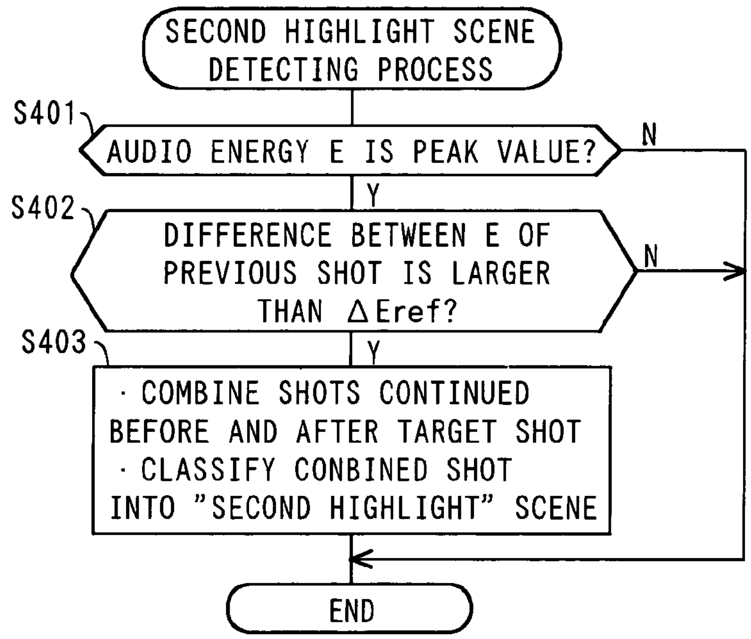
FIG. 5 is a flowchart showing the procedure of the detecting process in the second highlight scene detector 4.

FIG. 5 is a flowchart showing the procedure of the detecting process in the second highlight scene detector 4, and when the audio signal or the energy value E obtained per band by the audio data analyzer 11 has a peak value, namely, the target shot S0 has stronger intensity than predetermined reference intensity, a plurality of shots which continue before and after the target shot S0 are provisionally classified into the highlight scene.

At step S401, decision is made whether an audio energy E accompanied by the current target shot S0 is a peak value based on a result of comparing with the energy value E of each shot input before the target shot S0. When the audio energy E is the peak value, the sequence proceeds to step S402, so that a difference between the energy value E of the target shot and the energy value E of the shot just before the target shot S0 is compared with the reference differential value Δ Eref. When the difference is larger than the reference differential value Δ Eref, the sequence proceeds to step S403, so that a predetermined number of shots S0−n to S0+n (or for predetermined time) which continue before and after the target shot S0 are combined and the combined shots are classified into a “second highlight scene”.

Figure 6:
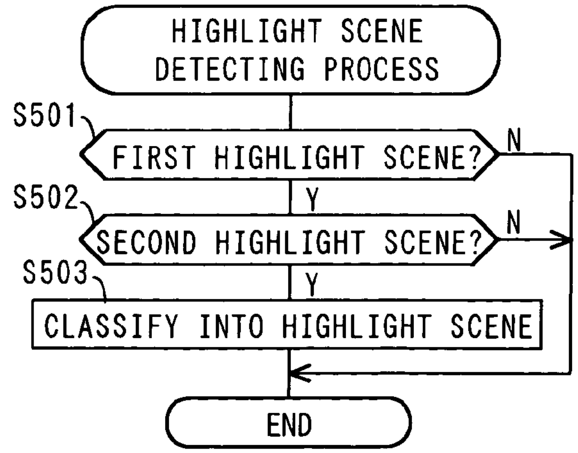
FIG. 6 is a flowchart showing the scene classification procedure in the highlight scene detector 5.

FIG. 6 is a flowchart showing the scene classification procedure in the highlight scene detector 5, and the highlight scene is finally detected based on the detected results of the first and second highlight scene detectors 3, 4.

At step S501, decision is made whether a current target shot is classified into the first highlight scene, and when the current target shot is the first highlight scene, the sequence proceeds to step S502. At step S502, decision is made whether the current target shot is classified into the second highlight scene, and when it is the second highlight scene, the sequence proceeds to step S503. At step S503, the current target shot is classified into the highlight scene.

Figure 7:
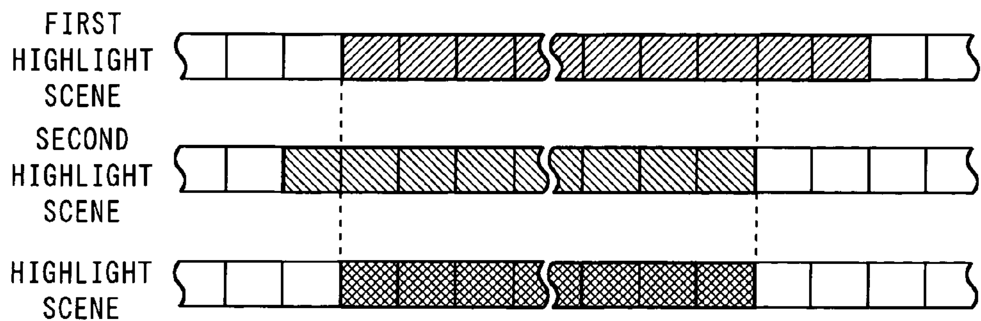
FIG. 7 is a pattern diagram showing the highlight scene classification method in the highlight scene detector 5.

FIG. 7 is a pattern diagram showing the highlight scene classification method in the highlight scene detector 5, and hatched shots are the highlight scene. In this embodiment, only the shots which are shorted into both the first highlight scene and the second highlight scene are finally classified into the highlight scene.

Figure 8:
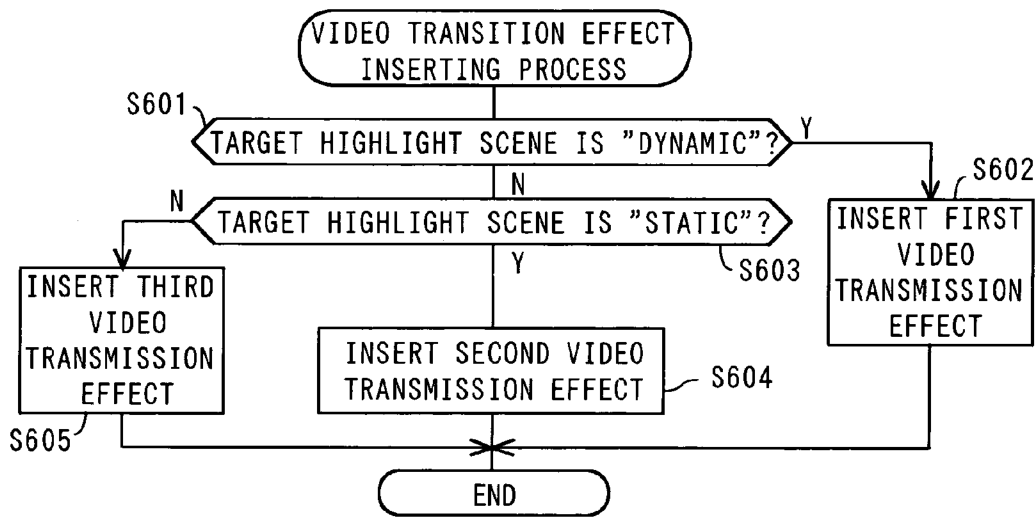
FIG. 8 is a flowchart showing an operation of the video transition effect inserting section 6.

FIG. 8 is a flowchart showing an operation of the video transition effect inserting section 6, and when a plurality of highlight scenes are extracted so as to be connected, the video transition effect is suitably selected so as to be inserted between the highlight scenes and played. When a video in which only the highlight scenes are collected is played, this process is executed in real time, or when a video in which only the highlight scenes are collected is created, this process is executed offline.

At step S601, decision is made whether the respective shots of the current target highlight scene are classified into the dynamic scene in the dynamic/static scene detector 1. When they are classified into the dynamic scene, a gradual transition such as instant image switching or wipe is inserted as a first video transition effect before the target highlight scene at step S602.

On the contrary, when the target highlight scene is classified into the static scene, the sequence proceeds from the step S603 to S604, so that an effect with large change in the image mixing ratio such as dissolve and fade is inserted as a second video transition effect. When the target highlight scene is not classified into the dynamic scene nor the static scene, one of the first and the second video transition effects or a third video transition effect is inserted at step S605. When the shots composing the highlight scene include different scene types, one scene type is determined by majority.

Figure 9:
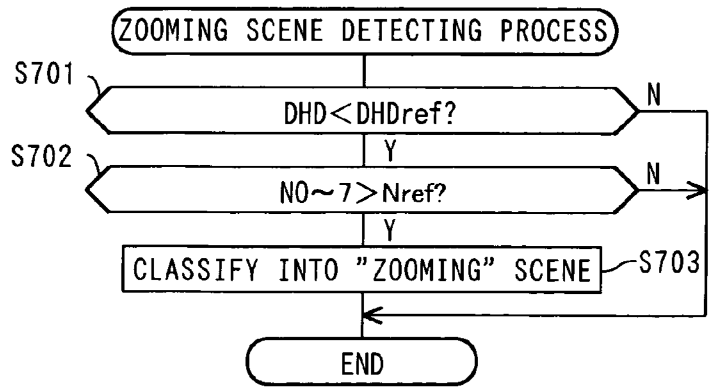
FIG. 9 is a flowchart showing a procedure of the detecting process in the detector 7.

FIG. 9 is a flowchart showing a procedure of the detecting process in the zooming scene detector 7, and FIG. 10 is diagram showing a histogram distribution which is characteristic of a zooming scene. In this process, decision is made whether the shots segmented by the shot segmentation part 10 are shots composing the zooming scene.

Figure 10A:
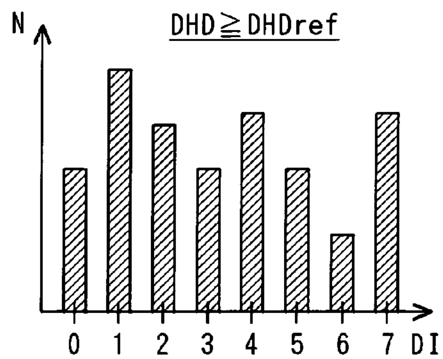
FIG. 10 is diagram showing a histogram distribution which is characteristic of a zooming scene.

At step S701, as to a current target shot, dispersion of the histogram distribution DHD obtained by quantizing the histogram of motion direction HD is compared with a reference dispersion value DHDref. As shown in FIG. 10A, when the dispersion of the histogram distribution DHD is large and its value exceeds the reference dispersion value DHDref, the target shot is not classified into the zooming scene and this process is ended.

Figure 10B:
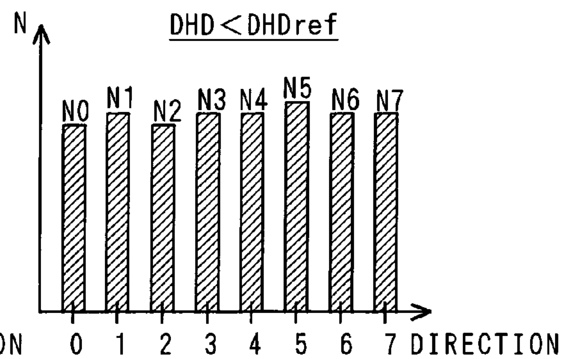
Figure 11A:
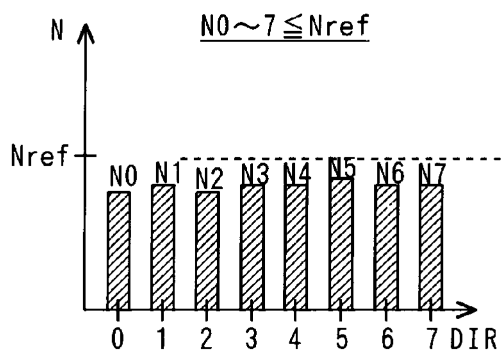
FIG. 11 is diagram showing a histogram distribution which is characteristic of a zooming scene.
Figure 11B:
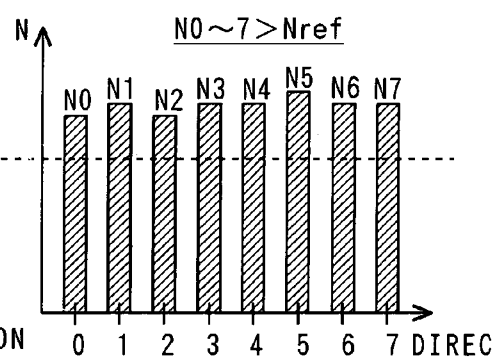

On the contrary, as shown in FIG. 10B, when the dispersion of the histogram distribution DHD is small and its value is smaller than the reference dispersion value DHDref, the sequence proceeds to step S702. At step S702, a number of elements of the bins in the histogram distribution N0 to N7 is compared with a reference number of elements Nref. As shown in FIG. 11A, when a number of the elements of any bins is less than the reference number of elements Nref, the target shot is not classified into the zooming scene and the process is ended. As shown in FIG. 11B, when a number of the elements of all the bins N0 to N7 exceeds the reference number of elements Nref, the sequence proceeds to step S703, so that the current target shot is classified into the zooming scene.

Figure 12:
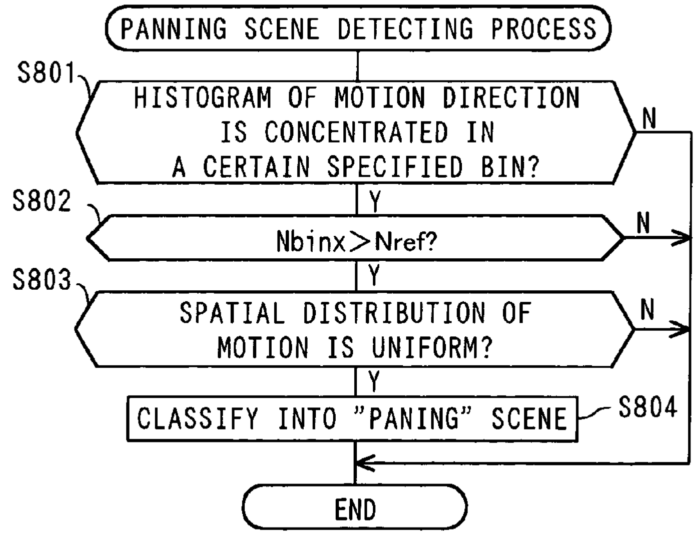
FIG. 12 is a flowchart showing a procedure of the detecting process in the panning scene detector 8.

FIG. 12 is a flowchart showing a procedure of the detecting process in the panning scene detector 8, and decision is made whether the shots segmented by the shot segmentation part 10 are shots composing a panning scene.

Figure 13:
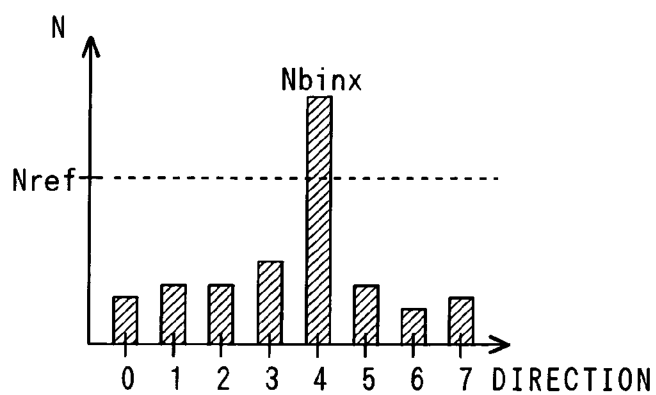
FIG. 13 is diagram showing a histogram distribution which is characteristic of a panning scene.

At step S801, as to a current target shot, decision is made whether the distribution of the histogram of motion direction HD detected by the HD detector 203 is concentrated in a certain specified bin (direction). As shown in FIG. 12, when only a number of elements of specified bin (here, a bin in a direction "4") is specifically large, the sequence proceeds to step S802, so that a number of the elements of the specified bin Nbinx is compared with the predetermined reference number of the elements Nref. As shown in FIG. 13, when a number of the elements of the specified bin Nbinx exceeds the reference number of the elements Nref, the sequence proceeds to step S803. At step S803, decision is made whether the spatial distribution of motion of the target shot MSD is uniform, and when it is uniform, the sequence proceeds to step S804 so that the current target shot is classified into the "panning" shot.

Figure 14:
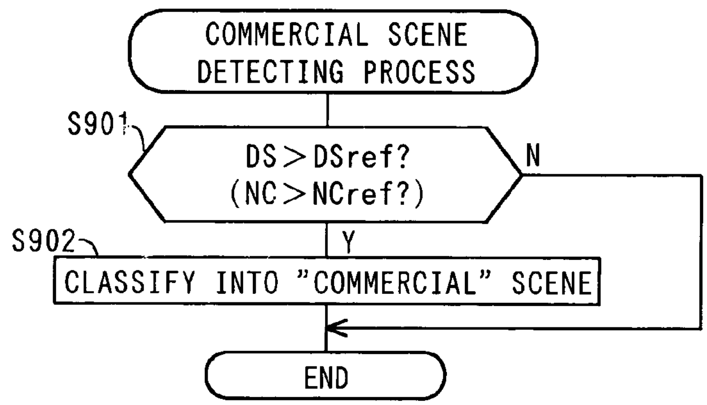
FIG. 14 is a flowchart showing a procedure of the detecting process in the commercial scene detector 9.

FIG. 14 is a flowchart showing a procedure of the detecting process in the commercial scene detector 9, and when input video are television broadcasting program or the like including commercial, the shot density DS obtained by the shot segmentation part 10 is utilized so that decision is made whether a series of the input shots is a commercial scene.

At step S901, as to a current target shot, the shot density DS detected by the DS detector 102 is compared with reference density DSref. Not the shot density DS but a number of shot boundaries NC within a predetermined interval may be compared with a predetermined reference number NCref. When DS>DSref (NC>NCref), the sequence proceeds to step S902, so that the target shot is classified into the commercial scene.

Figure 15:
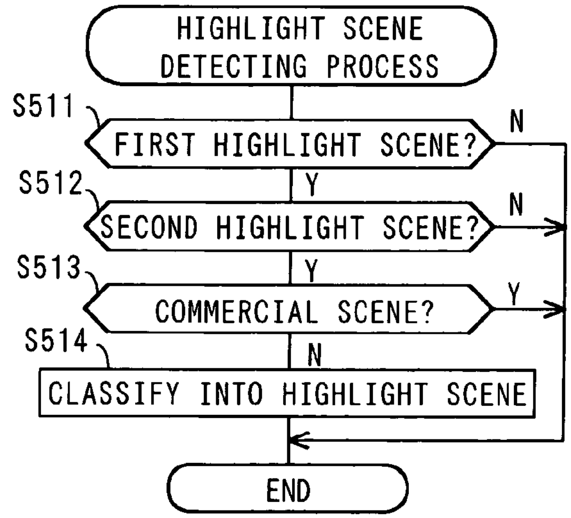
FIG. 15 is a flowchart showing another procedure of the scene classification in the highlight scene detector 5.

FIG. 15 is a flowchart showing another procedure of the scene classification in the highlight scene detector 5, and the highlight scene is finally detected based on the detected results of the first and second highlight scene detectors 3, 4 and the detected result of the commercial scene detector 9.

In the highlight scene detecting method explained with reference to FIGS. 4, 5, 6 and 7, the commercial scene having a comparatively high audio level is possibly misdecided as the highlight scene. In this embodiment, therefore, such misdecision is prevented and only the original highlight scene is classified reliably.

At step S511, decision is made whether a current target shot is classified into the first highlight scene, and when it is the first highlight scene, the sequence proceeds to step S512. At step S512, decision is made whether the target shot is classified into the second highlight scene, and when it is the second highlight scene, the sequence proceeds to step S513. At step S513, decision is made whether the current target shot is the commercial scene, and when it is not the commercial scene, the sequence proceeds to step S514 so that the current target shot is classified into the highlight scene.

Figure 16:
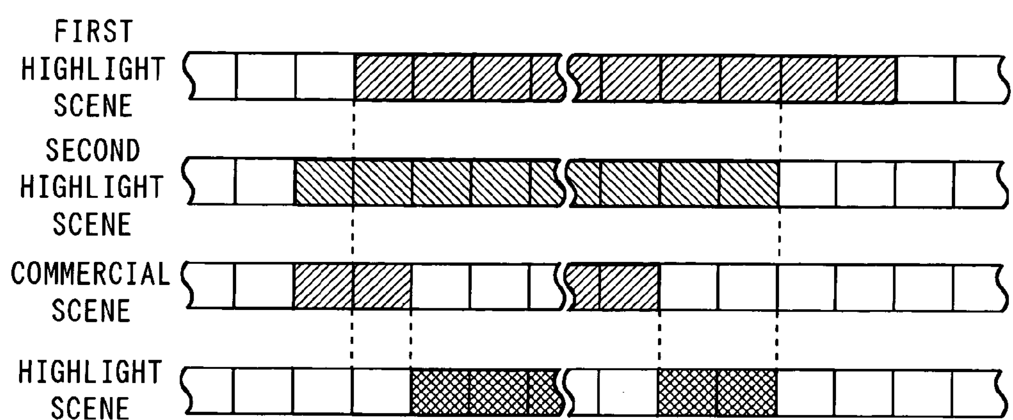
FIG. 16 is a pattern diagram showing the highlight scene classification method, and hatched shots are the highlight scene.

FIG. 16 is a pattern diagram showing the highlight scene classification method, and hatched shots are the highlight scene. In this embodiment, only the shots other than the first highlight scene, the second highlight scene and the commercial scene are finally classified into the highlight scene.

According to the present invention, the scenes of the uncompressed or compressed video are classified into various types, so that a desired scene can be searched and viewed from the video and a lot of video can be effectively classified, and also the classified scene can be played in an optimum form.

What is claimed is:

1. A scene classification apparatus of video for classifying a sequence of shots into a dynamic scene with much motion or a static scene with little motion, where the dynamic scene and the static scene respectively include a plurality of continuous shots and are thus a larger unit than a shot, comprising:

a shot segmentation device to segment the video into respective shots based on a cut points;

a calculator for calculating shot density DS of the video per a time unit from the respective segmented shots;

a calculator for calculating motion intensity per unit region on an image using a value of motion vectors of the respective segmented shots; and a dynamic/static scene classifier for classifying the sequence of shots into the dynamic scene with much motion, the static scene with little motion or an other scene except the dynamic scene and static scene based on the shot density and the motion intensity of the respective segmented shots, wherein each scene includes a plurality of cut points, wherein the dynamic/static scene classifier classifies a sequence of shots whose shot density is larger than a first reference density and whose motion intensity is stronger than a first reference intensity into the dynamic scene, and classifies a sequence of shots whose shot density is smaller than a second reference density and whose motion intensity is weaker than a second reference intensity into the static scene, wherein a sequence of shots whose shot density is not larger than the first reference density or whose motion intensity is not stronger than the first reference intensity, and a sequence of shots whose shot density is not smaller than the second reference density or whose motion intensity is not weaker than the second reference intensity are classified as neither the dynamic scene nor the static scene.

2. A scene classification apparatus of video for classifying a sequence of shots into a slow scene, where the slow scene includes a plurality of continuous shot and is thus a larger unit than a shot, comprising: a shot segmentation device to segment the video into respective shots based on cut points; an extractor for extracting from the respective segmented shots a shot similar to a current target shot from shots after a shot before the current target shot only by a predetermined interval; and a slow scene detector for classifying the target shot into a slow scene of the shot similar to the current target shot based on motion intensity of the current target shot and the shot similar to the current target shot, wherein each scene includes a plurality of cut points; wherein the slow scene detector classifies the target shot into the slow scene of the shot similar to the current target shot when the motion intensity of the shot similar to the current target shot is stronger than the motion intensity of the current target shot.

3. The scene classification apparatus of video according to claim 2, further comprising a first highlight scene detector for classifying a scene composed of a plurality of shots continued just before the slow scene into a first highlight scene.

4. The scene classification apparatus of video according to claim 3, further comprising:

detector for detecting intensity of an audio signal accompanied by the video into shot; and a second highlight scene detector for classifying a scene composed of a plurality of shots continued before and after a shot with the audio signal intensity stronger than the predetermined intensity into a second highlight scene, wherein the scene classified into the first highlight scene and the second highlight scene is classified into the highlight scene.

5. The scene classification apparatus of video according to claim 4, further comprising:

a commercial scene detector for classifying the respective shots into a commercial scene, wherein a scene classified into a scene other than the first highlight scene, the second highlight scene and the commercial scene is classified into the highlight scene.

6. The scene classification apparatus of video according to claim 1 or 2, wherein the video are compressed data, and the motion intensity is detected by using a value of a motion vector of a predictive coding image existing in each shot.

7. The scene classification apparatus of video according to claim 1 or 2, wherein the video are uncompressed data, and the motion intensity is detected by using a value of a motion vector representing a change in motion predicted from a compared result of frames composing the respective shots.

8. The scene classification apparatus of video according to claim 1 or 4, wherein the video are uncompressed data, and the spatial distribution of motion is detected by using a value of a motion vector representing a change in motion predicted from a compared result of frames composing the respective shots.

9. The scene classification apparatus of video according to claim 1 or 4, wherein the video are uncompressed data, and the histogram of motion direction is detected by using a value of a motion vector representing a change in motion predicted from a compared result of frames composing the respective shots.

10. A scene classification apparatus of video for classifying a sequence of shots into a scene in which a camera operation has been performed, where the scene in which the camera operation has been performed includes a plurality of continuous shots and is thus a larger unit than a shot, comprising: a shot segmentation device to segment the video into respective shots based on cut points; a detector for detecting a histogram relating to motion directions of the respective segmented shots; and a detector for detecting the scene in which the camera operation has been performed based on the histogram of motion direction, wherein each scene includes a plurality of cut points; detector for detecting spatial distribution of motion of each shot; and a panning scene detector for detecting whether the respective shots are a panning scene based on the histogram of motion direction and the spatial distribution of motion.

11. The scene classification apparatus of video according to claim 10, further comprising a zooming scene detector for, when the histogram of motion direction is uniform and a number of elements of respective bins is larger than a reference number of elements, classifying its shot into a zooming scene.

12. The scene classification apparatus of video according to claim 10, wherein when the histogram of motion direction is concentrated in one direction and the spatial distribution of motion is uniform, the panning scene detector classifies the shot into the panning scene.

13. The scene classification apparatus of video according to claim 10, wherein the video are compressed data, and the spatial distribution of motion is detected by using a value of a motion vector of a predictive coding image existing in each shot.

14. The scene classification apparatus of video according to claim 10, wherein the video are compressed data, and the histogram of motion direction is detected by using a value of a motion vector of a predictive coding image existing in each shot.

15. A scene classification apparatus of video for segmenting video into shots based on cut points and classifying each scene composed of one or more continuous shots based on a content of the scene, comprising: a detector for detecting a highlight scene; extracting and combining means for extracting and combining a plurality of highlight scenes; and inserting means for inserting a video transition effect into a combined portion of the respective highlight scenes, the inserting means including a dynamic/static scene detector to detect whether a highlight scene is a dynamic scene with much motion or a static scene with little motion, wherein the inserting means makes a type of the video transition effect to be inserted different according to whether the highlight scenes to be combined are the dynamic scene or the static scene, wherein each scene includes a plurality of cut points; the highlight scene is the dynamic scene, the video transition effect with small change in an image mixing ratio is inserted therein, and when the highlight scene is the static scene, the video transition effect with large change in the image mixing ratio is inserted therein.

16. A scene classification method of video for classifying a sequence of shots into a dynamic scene with much motion or a static scene with little motion, where the dynamic scene and the static scene respectively include a plurality of continuous shots and are thus a larger unit than a shot, comprising:

segmenting the video into respective shots using a shot segmentation device that segments the video based on cut points;

calculating shot density DS of the video per a time unit from the respective segmented shots;

calculating motion intensity per unit region on an image using a value of motion vectors of the respective segmented shots; and classifying the sequence of shots into the dynamic scene with much motion, the static scene with little motion or an other scene except the dynamic scene and static scene based on the shot density and the motion intensity of the respective segmented shots, wherein each scene includes a plurality of cut points, wherein the classifying classifies a sequence of shots whose shot density is larger than a first reference density and whose motion intensity is stronger than a first reference intensity into the dynamic scene, and classifies a sequence of shots whose shot density is smaller than a second reference density and whose motion intensity is weaker than a second reference intensity into the static scene, and wherein the classifying classifies a sequence of shots whose shot density is not larger than the first reference density or whose motion intensity is not stronger than the first reference intensity, and a sequence of shots whose shot density is not smaller than the second reference density or whose motion intensity is not weaker than the second reference intensity as neither the dynamic scene nor the static scene.

* * * * *